(12) United States Patent
Hsiao

(10) Patent No.: US 8,002,423 B2
(45) Date of Patent: Aug. 23, 2011

(54) BACKLIGHT MODULE WITH POSITION PART ABUTTING AGAINST INNER SURFACE OF BOTTOM PLATE OF FRAME AND LIQUID CRYSTAL DISPLAY UTILIZING SAME

(75) Inventor: Chih-Chung Hsiao, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 288 days.

(21) Appl. No.: 12/287,965

(22) Filed: Oct. 14, 2008

(65) Prior Publication Data
US 2009/0097231 A1   Apr. 16, 2009

(30) Foreign Application Priority Data
Oct. 12, 2007   (CN) ........................ 2007 2 0172390 U

(51) Int. Cl.
  *G09F 13/10*   (2006.01)
  *F21V 19/00*   (2006.01)
  *F21V 17/02*   (2006.01)
  *F21S 4/00*    (2006.01)
(52) U.S. Cl. .................. 362/97.4; 362/217.14; 362/449
(58) Field of Classification Search ........ 362/97.1–97.4, 362/225, 217.13, 217.14, 217.15, 217.17, 362/288, 449
See application file for complete search history.

(56) References Cited

U.S. PATENT DOCUMENTS

| | | | | |
|---|---|---|---|---|
| 998,223 | A * | 7/1911 | Anok ........................ | 362/217.16 |
| 6,722,773 | B2 | 4/2004 | Tsai et al. | |
| 7,070,313 | B2 * | 7/2006 | Kim et al. ..................... | 362/561 |
| 7,461,958 | B2 * | 12/2008 | Takata et al. .................. | 362/433 |
| 7,510,318 | B2 * | 3/2009 | Chen ............................ | 362/634 |
| 7,594,747 | B2 * | 9/2009 | Tsai et al. ..................... | 362/634 |
| 7,600,889 | B2 * | 10/2009 | Fukuda ......................... | 362/225 |
| 7,604,390 | B2 * | 10/2009 | Zhang et al. .................. | 362/634 |
| 7,826,005 | B2 * | 11/2010 | Lee et al. ..................... | 362/97.2 |
| 7,826,008 | B2 * | 11/2010 | Baba ............................ | 362/97.1 |
| 2009/0046445 | A1 * | 2/2009 | Namiki et al. ............... | 362/97.2 |

\* cited by examiner

*Primary Examiner* — Alan Cariaso
(74) *Attorney, Agent, or Firm* — Wei Te Chung

(57) ABSTRACT

In an exemplary embodiment, a backlight module (20) includes a frame (21), a diffuser (25) and a supporting member (29). The frame includes a bottom plate (213). The diffuser is accommodated in the frame opposite to the bottom plate. The supporting member includes a supporting bar (290), a blocker (297) and at least one elastic arm (292). The supporting bar supports the diffuser. The blocker extends from an end of the supporting bar. Each elastic arm extends from the supporting bar. The blocker elastically abuts against an outer surface of the bottom plate. Each elastic arm has one end abutting a bottom of the frame at an inner surface of the bottom plate. A liquid crystal display (2) employing the backlight module is also provided.

18 Claims, 4 Drawing Sheets

BACKLIGHT MODULE WITH POSITION PART ABUTTING AGAINST INNER SURFACE OF BOTTOM PLATE OF FRAME AND LIQUID CRYSTAL DISPLAY UTILIZING SAME

CROSS-REFERENCE TO RELATED APPLICATION

This application is related to, and claims the benefit of, a foreign priority application filed in China as Serial No. 200720172390.6 on Oct. 12, 2007. The related application is incorporated herein by reference.

FIELD OF THE INVENTION

The present disclosure relates to backlight modules; and more specifically to a direct-type backlight module with a supporting member for supporting an optical film such as a diffuser, and a liquid crystal display utilizing the backlight module.

GENERAL BACKGROUND

Liquid crystal displays are commonly used as display devices for compact electronic apparatuses because they not only provide good quality images with little power, but also are very thin. The liquid crystal in a liquid crystal display does not emit any light itself. The liquid crystal has to be lit by a light source so as to clearly and sharply display text and images. Thus, a backlight module including an illuminant is generally needed for a liquid crystal display. In general, there are two types of backlight modules, which are distinguished according to where the illuminant is located in the backlight module. The two types are the side-edge-type backlight module and direct-type backlight module.

The use of the liquid crystal display is becoming increasingly widespread, and large size liquid crystal displays such as liquid crystal televisions are becoming very popular. One major solution to enhancing the total emitting luminance of a large size liquid crystal display is to increase the number of illuminants utilized in the backlight module. It is much easier to increase the number of illuminants of a direct-type backlight module than to increase the number of illuminants of a side-edge-type backlight module. Accordingly, direct-type backlight modules have become the mainstream backlight module of large size liquid crystal displays.

Referring to FIG. 8, a related art backlight module 10 includes a frame 11, a reflecting plate 13, a diffuser 15, a plurality of linear light tubes 17, and two supporting members 19 for supporting the diffuser 15. The frame 11 forms a receiving space (not labeled) to accommodate the reflecting plate 13, the diffuser 15, the linear light tubes 17, and the supporting members 19. The light tubes 17 are parallel to each other and are disposed between the reflecting plate 13 and the diffuser 15. Each of the two supporting members 19 is disposed between two corresponding light tubes 17. A bottom end of each supporting member 19 is fixed to a bottom plate of the frame 11, and a top end of each supporting member 19 contacts the diffuser 15 in order to avoid distortion of the diffuser 15.

Even after the backlight module 10 has been assembled, the diffuser 15 is typically not very tightly integrated with the frame 11. Therefore the diffuser 15 may repeatedly shift or shake when the backlight module 10 is subjected to vibration such as during transportation. The diffuser 15 typically strikes the supporting members 19, and the supporting members 19 scrape the diffuser 15. Thus, the optical characteristic of the diffuser 15 is impaired, and the uniformity of light emitting from the backlight module 10 during operation is reduced.

What is needed, therefore, is a backlight module that can overcome the described limitations.

SUMMARY

In an exemplary embodiment, a backlight module includes a frame, a diffuser and a supporting member. The frame includes a bottom plate. The diffuser is accommodated in the frame opposite to the bottom plate. The supporting member includes a supporting bar, a blocker and at least one elastic arm. The supporting bar supports the diffuser. The blocker extends from an end of the supporting bar. Each elastic arm extends from the supporting bar. The blocker elastically abuts against an outer surface of the bottom plate. Each elastic arm has one end abutting a bottom of the frame at an inner surface of the bottom plate. A liquid crystal display employing the backlight module is also provided.

Other aspects, novel features and advantages will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment of the present disclosure. In the drawings, like reference numerals designate corresponding parts throughout various views, and all the views are schematic.

DETAILED DESCRIPTION OF PREFERRED EMBODIMENTS

Reference will now be made to the drawings to describe various embodiments of the present disclosure in detail.

Figure 1:
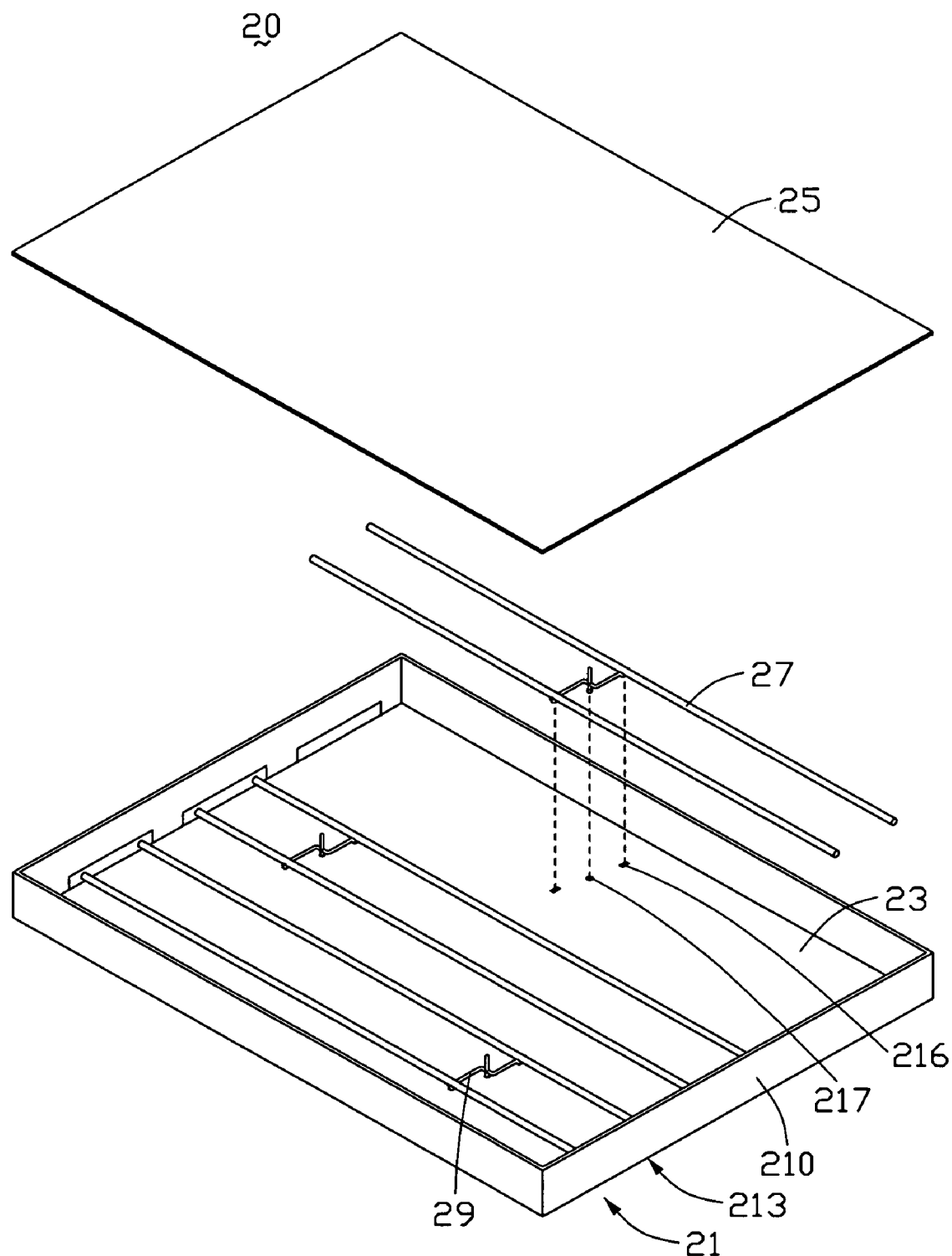
FIG. 1 is an exploded, isometric view of a backlight module according to a first embodiment of the present disclosure, the backlight module including a diffuser and a plurality of supporting members.

Referring to FIG. 1, a backlight module according to a first embodiment of the present disclosure is shown. The backlight module 20 is a direct-type backlight module, and includes a reflecting plate 23, a diffuser 25, a plurality of light tubes 27, a plurality of supporting members 29, and a frame 21. The frame 21 accommodates the reflecting plate 23, the diffuser 25, the light tubes 27, and the supporting members 29.

Figure 4:
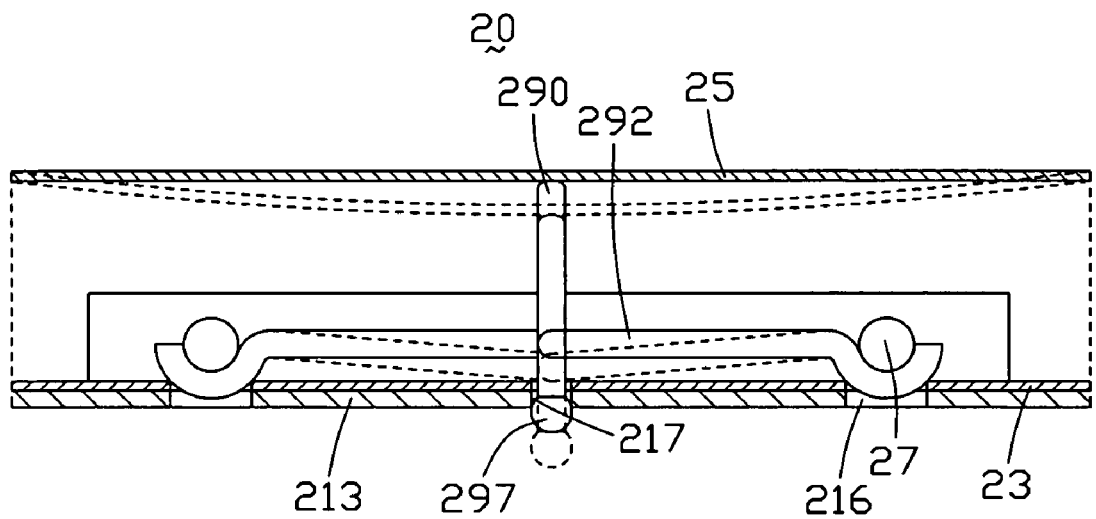
FIG. 4 is an enlarged, side sectional view of part of the backlight module of FIG. 1 once the backlight module has been assembled.

The frame 21 includes four side walls 210 and a bottom plate 213. The four side walls 210 are arranged end to end, and together with the bottom plate 213 cooperatively form a receiving space (not labeled). A plurality of fixing holes 216 and receiving holes 217 are defined in the bottom plate 213. Each receiving hole 217 and two corresponding adjacent fixing holes 216 form a group of holes corresponding to one supporting member 29. The fixing holes 216, for example, can be rectangular; and the receiving hole 217, for example, can be round. The reflecting plate 23 is disposed on an inner surface of the bottom plate 213. The reflecting plate 23 has holes (not labeled) corresponding to the fixing holes 216 and the receiving holes 217. Referring also to FIG. 4, the diffuser 25 is accommodated in a topmost portion of the receiving space opposite to the reflecting plate 23, and maintains an appropriate distance from the reflecting plate 23. The light tubes 27 are linear illuminators, and can for example be cold cathode fluorescent lamps (CCFLs). The light tubes 27 are arranged parallel to each other, and are disposed between the diffuser 25 and the reflecting plate 23. Two ends of each light tube 27 are fixed to two opposite side walls 210 of the frame 21, respectively. The supporting members 29 are disposed between the plurality of light tubes 27 to support the diffuser 25 and the light tubes 27.

Figure 2:
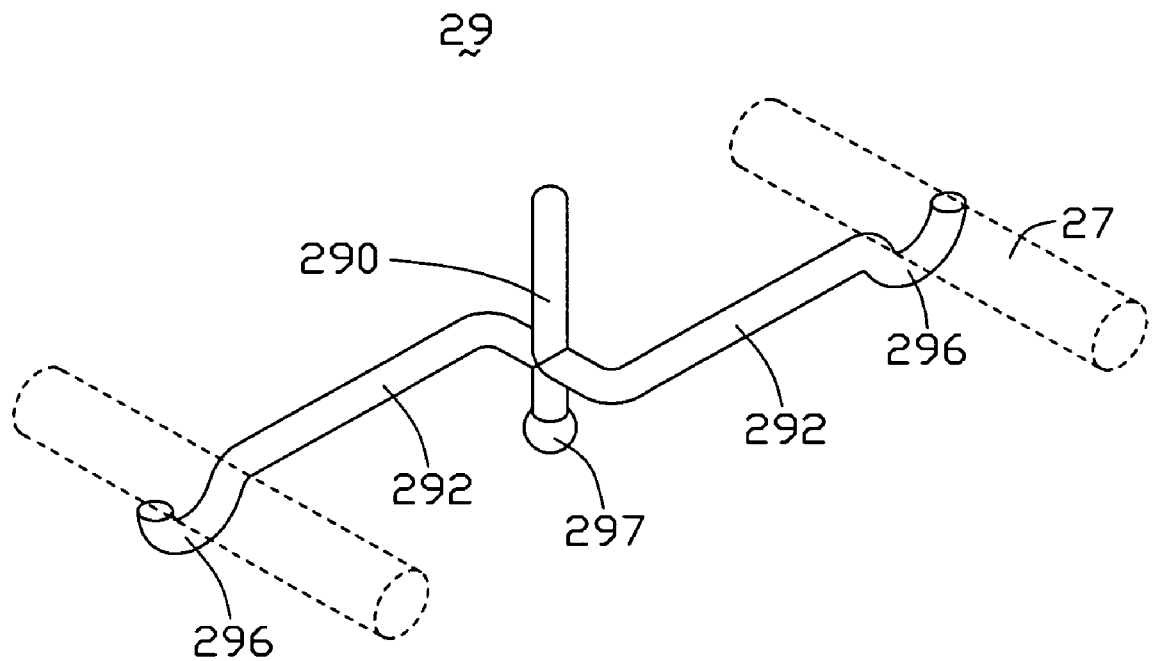
FIG. 2 is an enlarged view of one of the supporting members of FIG. 1.
Figure 3:
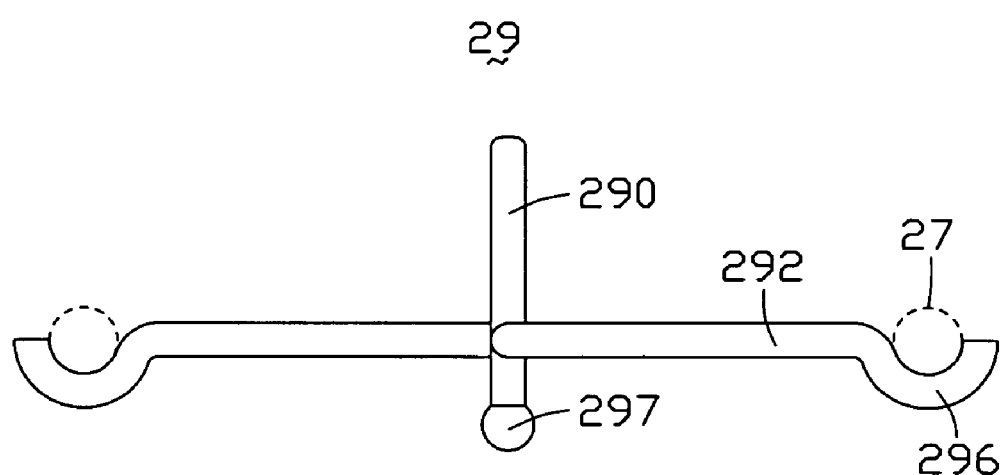
FIG. 3 is a side plan view of the supporting member of FIG. 2.

Referring also to FIG. 2 and FIG. 3, each supporting member 29 is molded to form a supporting bar 290 and two elastic arms 292 lying perpendicular the supporting bar 290. The supporting bar 290 includes a main cylindrical portion (not labeled), and a spherical elastic blocker 297 extending from a bottom end of the cylindrical portion. The supporting bar 290 has a diameter smaller than that of each receiving hole 217. The spherical elastic blocker 297 has a diameter greater than that of each receiving hole 217.

Vertical distances from each of the elastic arms 292 to the bottom plate 213 are the same. Each of the elastic arms 292 includes an L-shaped main body (not labeled) with a circular cross section, and a positioning part 296 also with a circular cross section. The positioning part 296, for example, can be generally C-shaped or semicircular. The main body directly extends from the cylindrical portion of the supporting bar 290 along a direction parallel to the bottom plate 213. The positioning part 296 extends from a distal end of the main body. The positioning part 296 bulges toward the bottom plate 213, with a corresponding hollow (or opening) of the positioning part 296 facing toward the diffuser 25. The bulge of the positioning part 296 has an appropriate curvature to ensure that a corresponding light tube 27 can be fittingly held therein.

Referring particularly to FIG. 4, each supporting member 29 is received in the receiving space of the frame 21. The elastic blocker 297 is interferentially passed through the corresponding receiving hole 217. Thereby, the bottom end of the cylindrical portion of the supporting bar 290 is received in the receiving hole 217, with a top end of the elastic blocker 297 is being received in the receiving hole 217 and abutting against an outer surface of the bottom plate 213. For example, the top end of the elastic blocker 297 may elastically abut against the outer surface of the bottom plate 213. Simultaneously, a top end of the cylindrical portion lightly contacts the diffuser 25, and the positioning parts 296 of the elastic arms 292 are received in the corresponding fixing holes 216 and abut against an inner surface of the reflecting plate 23. For example, the top end of the cylindrical portion may elastically contact the diffuser 25, and the positioning parts 296 may elastically abut against the inner surface of the reflecting plate 23. Thus the supporting member 29 is elastically fixed to the bottom plate 213 of the frame 21. The corresponding light tube 27 is received in each positioning part 296, with two ends of the light tube 27 fixed to two opposite side walls 210 of the frame 21, respectively. The bend portion of the positioning part 296 steadily holds a middle portion of the light tube 27.

When the backlight module 20 is subjected to shock or vibration because of external force applied thereto, the diffuser 25 typically pushes on the supporting member 29. Thus, the supporting bar 290 of the supporting member 29 moves in the receiving hole 217 toward the outer side of the frame 21. Simultaneously, because the proximal ends of the main bodies of the elastic arms 292 are connected to the supporting bar 290 and the distal ends of the main bodies are connected to the positioning parts 296 that are held in the fixing holes 216, the main bodies of the elastic arms 292 bend toward the bottom plate 213 elastically. Thus, the elastic deformation of the elastic arms 292 helps release an amount of the reaction force that would otherwise be applied to the diffuser 25 by the top end of the supporting bar 290.

When the external force is released, the main bodies of the elastic arms 292 rebound gradually to drive the supporting bar 290 to move back upward until the blocker 297 is returned back to the receiving hole 217. The upward movement of the supporting bar 290 pushes the diffuser 25 gradually back to its initial position.

In summary, the supporting members 29 can elastically shift through the bending of the elastic arms 292, thereby avoiding forceful scraping of the diffuser 25 on the top end of the supporting bar 290. Thus, the decreasing of the light emitting from the backlight module 20 caused by the damaging of the diffuser 25 can be avoided, then the uniformity of the light emitting from the backlight module 20 can be enhanced.

Figure 5:
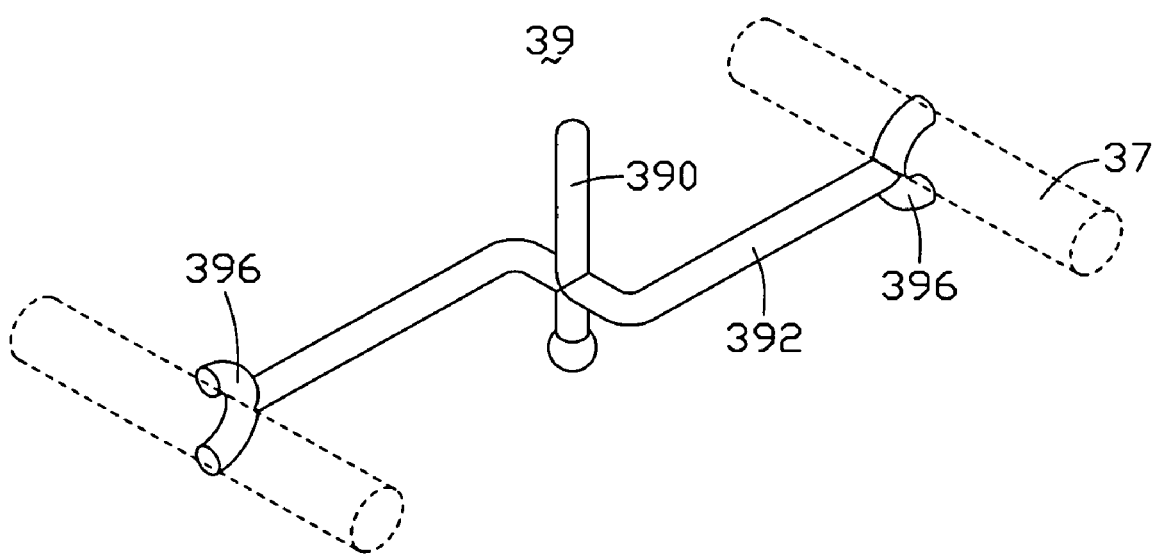
FIG. 5 is similar to FIG. 2, but showing a corresponding view in the case of a supporting member of a backlight module according to a second embodiment of the present disclosure.

Referring to FIG. 5, a supporting member 39 of a backlight module according to a second embodiment of the present disclosure is similar to the supporting member 29. The supporting member 39 includes a supporting bar 390 and two elastic arms 392. Each elastic arm 392 has an L-shaped main body (not labeled), and a generally C-shaped positioning part 396 extending from a distal end of the main body. In particular, a center portion of the positioning part 396 connects with the distal end of the main body, such that top and bottom halves of the positioning part 396 are symmetrically opposite each other across an axis defined by the distal end of the main body. The positioning part 396 bulges toward a middle area of the supporting member 39, with a corresponding hollow (or opening) facing toward a corresponding side wall (not shown) of a frame (not shown) of the backlight module. The bulge of the positioning part 396 has an appropriate curvature to ensure a corresponding light tube 37 can be fittingly held therein.

Figure 6:
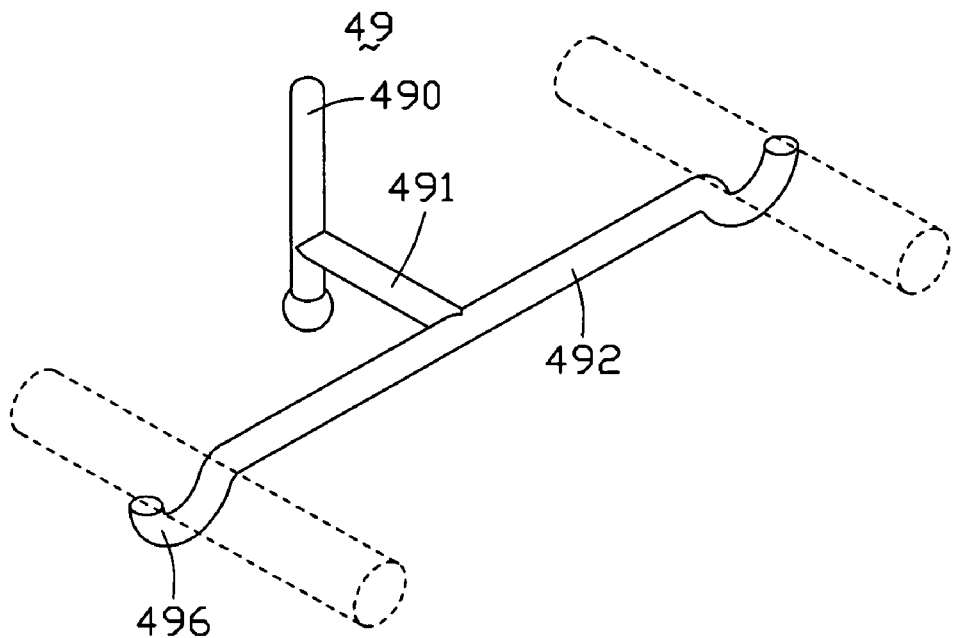
FIG. 6 is similar to FIG. 2, but showing a corresponding view in the case of a supporting member of a backlight module according to a third embodiment of the present disclosure.

Referring to FIG. 6, a supporting member 49 of a backlight module according to a third embodiment of the present disclosure is similar to the supporting member 29. The supporting member 49 includes a supporting bar 490, a connecting arm 491 extending from the supporting bar 490, and an elastic arm 492 extending from a distal end of the connecting arm 491. In particular, a center portion of the elastic arm 492 connects with the distal end of the connecting arm 491. Two positioning parts 496 extend from two distal ends of the elastic arm 492, respectively. Thus, the elastic arm 492 together with the connecting arm 491 cooperatively form a generally T-shaped structure. Left and right halves of the elastic arm 492 are symmetrically opposite each other across an axis defined by the connecting arm 491. The bulge of the positioning part 496 has an appropriate curvature to ensure a corresponding light tube (not labeled) can be fittingly held therein.

Figure 7:
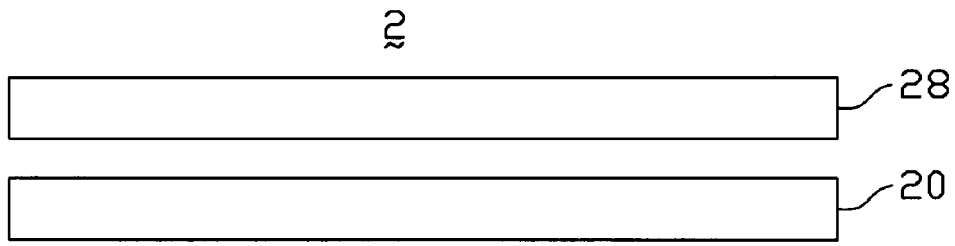
FIG. 7 is an exploded, side plan view of a liquid crystal display according to an embodiment of the present disclosure, the liquid crystal display including a liquid crystal panel and the backlight module of the first embodiment.
Figure 8:
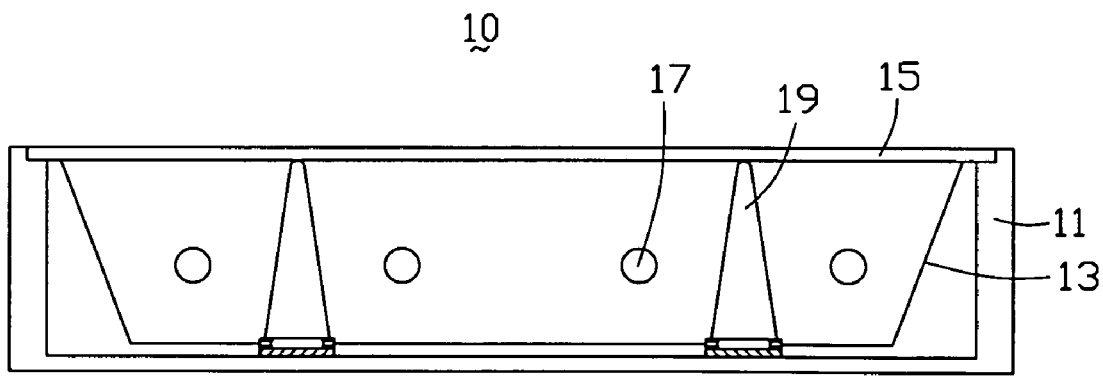
FIG. 8 is a side sectional view of a related art backlight module.

Referring to FIG. 7, a liquid crystal display of the present disclosure is shown. The liquid crystal display 2 includes the backlight module 20, and a liquid crystal panel 28 located adjacent to the backlight module 20. The backlight module 20 is configured to illuminate the liquid crystal panel 28. The backlight module 20 can be replaced by the backlight module according to either of the second and third embodiments.

Further or alternative embodiments may include the following. In a first example, each positioning part 396, 496 can be semicircular. In a second example, each positioning part 296, 396, 496 can be held on the reflecting plate 23 by means other than utilizing a corresponding fixing hole 216 of the bottom plate 213. For instance, if the positioning parts 296, 396, 496 are fixed on the reflecting plate 23, the light tubes can avoid trembling during transportation. In a third example, each of the supporting members 29, 39 can include three or more elastic arms 292, 392. In a fourth example, each of the supporting members 49 can include two or more elastic arms 492 or similar elastic arms.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A backlight module comprising:
    a frame comprising a bottom plate;
    a diffuser opposite to the bottom plate; and
    a supporting member, comprising:
        a supporting bar supporting the diffuser;
        a blocker extending from an end of the supporting bar, and elastically abutting against an outer surface of the bottom plate; and
        at least one elastic arm extending from the supporting bar, each elastic arm having one end abutting a bottom of the frame at an inner surface of the bottom plate;
    wherein the bottom plate comprises at least one fixing hole corresponding to the at least one elastic arm, one end of the at least one elastic arm forms a C-shaped positioning part fixed in the at least one fixing hole, and a light tube is accommodated in the frame and passes through the C-shaped positioning part.

2. The backlight module of claim 1, wherein the blocker extends from a bottom end of the supporting bar and the at least one elastic arm extends from a middle portion of the supporting bar.

3. The backlight module of claim 2, wherein the bottom plate further comprises a receiving hole with the supporting bar passing therethrough.

4. The backlight module of claim 3, wherein the blocker is partly accommodated in the receiving hole and stuck by the bottom plate.

5. The backlight module of claim 4, wherein the blocker is a spherical elastic one with a diameter greater than that of the receiving hole.

6. The backlight module of claim 1, wherein the at least one elastic arm is an L-shaped one.

7. A backlight module comprising:
    a frame comprising a bottom plate;
    a diffuser opposite to the bottom plate; and
    a supporting member, comprising:
        a supporting bar supporting the diffuser;
        a blocker extending from an end of the supporting bar, and elastically abutting against an outer surface of the bottom plate; and
        at least one elastic arm extending from the supporting bar, wherein the bottom plate comprises at least one fixing hole corresponding to the at least one elastic arm, an end of each elastic arm forms a positioning part, a light tube is accommodated in the frame and passes through the positioning part, and the positioning part abuts against an inner surface of the bottom plate, and is fixed in the corresponding at least one fixing hole.

8. The backlight module of claim 7, wherein the positioning part is a C-shaped one.

9. The backlight module of claim 7, wherein the at least one elastic arm is an L-shaped one.

10. The backlight module of claim 7, wherein the blocker extends from a bottom end of the supporting bar and the at least one elastic arm extends from a middle portion of the supporting bar.

11. The backlight module of claim 10, wherein the bottom plate comprises a receiving hole with the supporting bar passing therethrough.

12. The backlight module of claim 11, wherein the blocker is partly accommodated in the receiving hole and stuck by the bottom plate.

13. The backlight module of claim 12, wherein the blocker is a spherical elastic one with a diameter greater than that of the receiving hole.

14. A liquid crystal display comprising:
    a liquid crystal panel; and
    a backlight module configured to illuminate the liquid crystal panel, the backlight module comprising:
        a frame comprising a bottom plate;
        a diffuser opposite to the bottom plate; and
        a supporting member, comprising:
            a supporting bar supporting the diffuser;
            a blocker extending from an end of the supporting bar, and elastically abutting against an outer surface of the bottom plate; and
            at least one elastic arm connecting with the supporting bar, wherein the bottom plate comprises at least one fixing hole corresponding to the at least one elastic arm, an end of each elastic arm forms a positioning part, a light tube is accommodated in the frame and passes through the positioning part, and the positioning part abuts against an inner surface of the bottom plate, and is fixed in the fixing hole.

15. The liquid crystal display of claim 14, wherein the positioning part is a C-shaped one.

16. The liquid crystal display of claim 14, wherein the blocker extends from a bottom end of the supporting bar and the at least one elastic arm extends from a middle portion of the supporting bar.

17. The liquid crystal display of claim 16, wherein the bottom plate comprises a receiving hole with the supporting bar passing therethrough, and the blocker is partly accommodated in the receiving hole and stuck by the bottom plate.

18. The liquid crystal display of claim 17, wherein the blocker is a spherical elastic one with a diameter greater than that of the receiving hole.

* * * * *